May 29, 1951　　　M. M. MILLER　　　2,554,838
POTTERY MAKING MACHINE
Filed Dec. 30, 1949　　　3 Sheets-Sheet 1
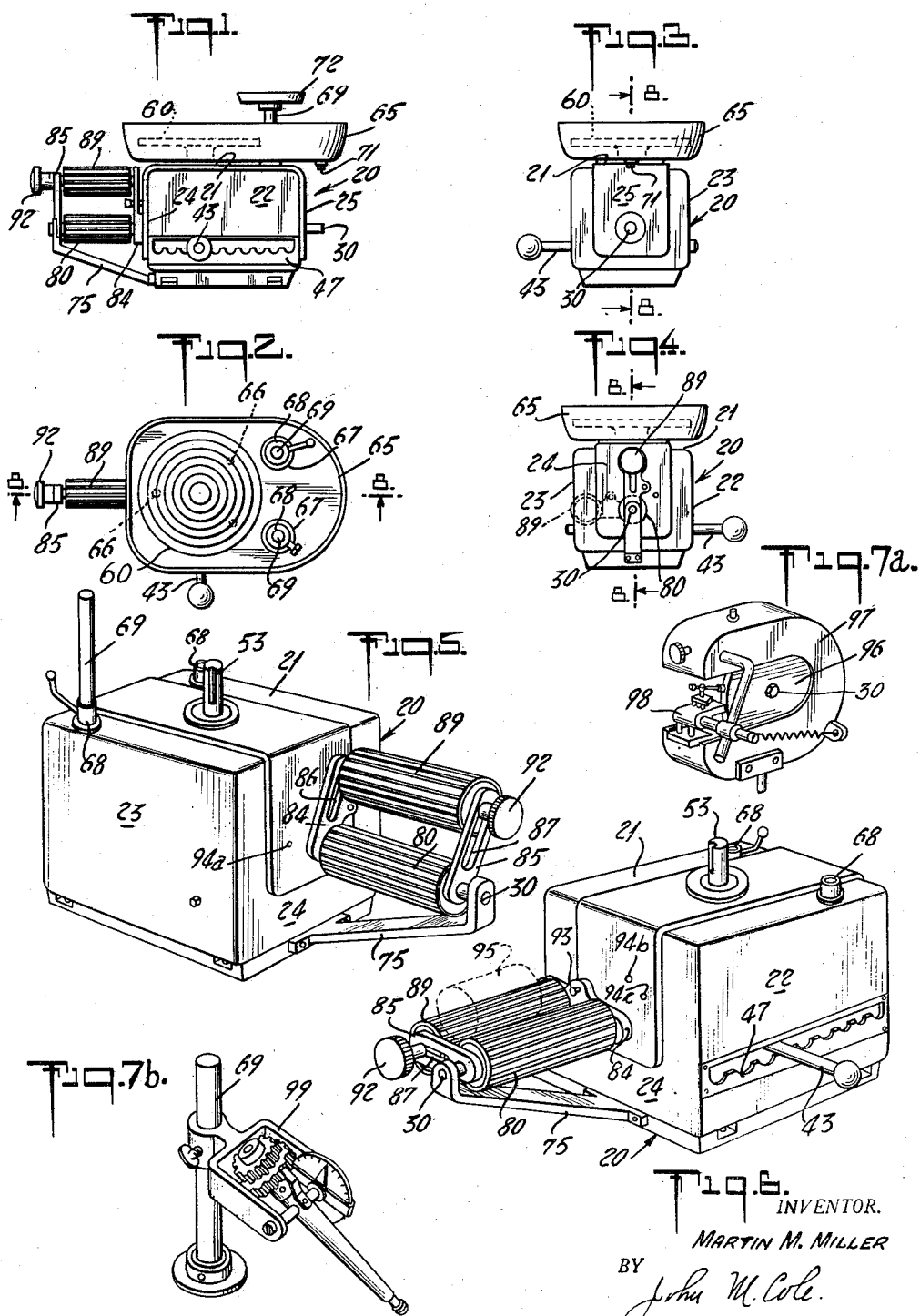
INVENTOR.
MARTIN M. MILLER
BY
John M. Cole.
ATTORNEY

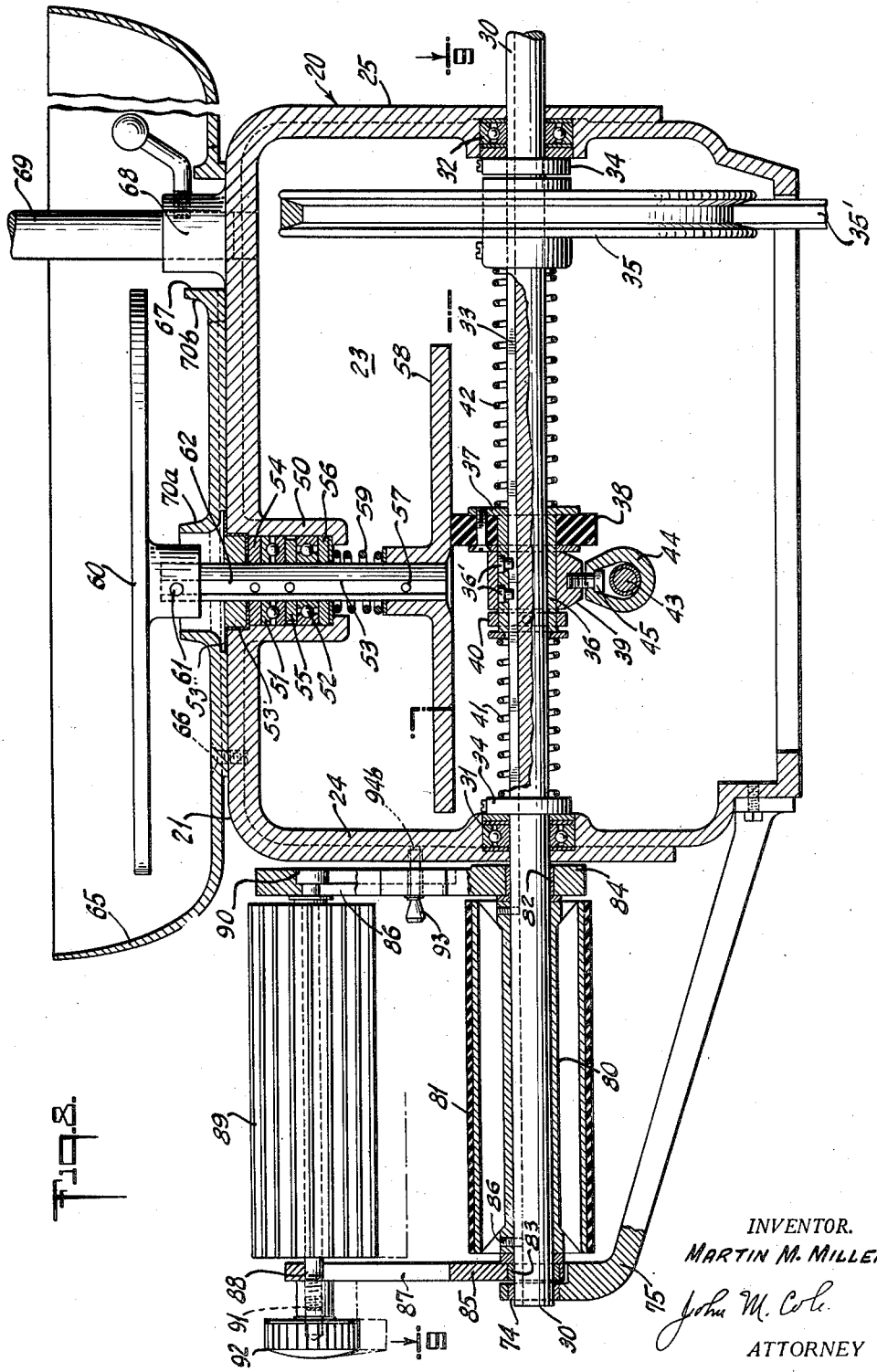

May 29, 1951  M. M. MILLER  2,554,838
POTTERY MAKING MACHINE
Filed Dec. 30, 1949  3 Sheets-Sheet 3
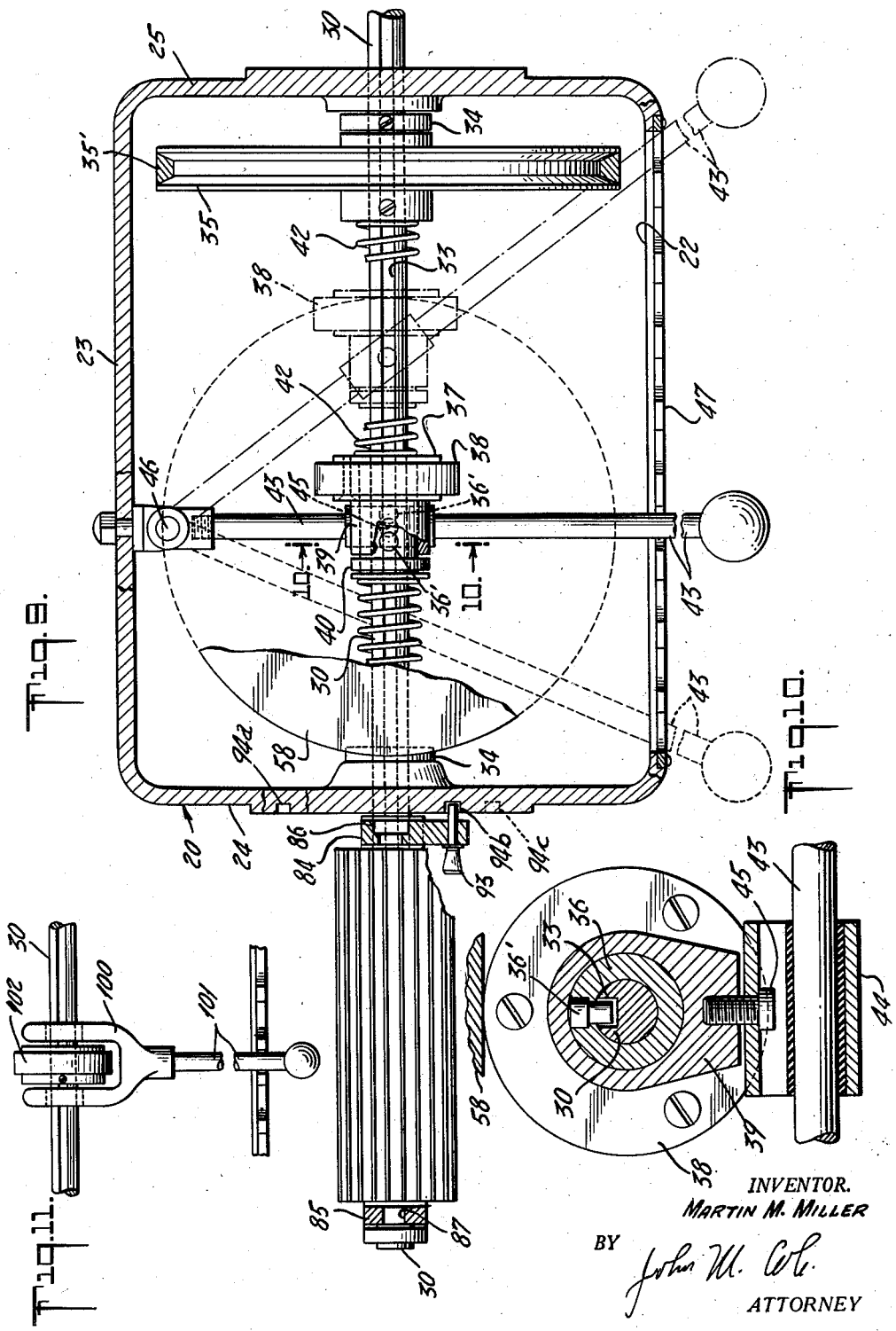
INVENTOR.
MARTIN M. MILLER
BY John M. Cole
ATTORNEY Patented May 29, 1951

2,554,838

UNITED STATES PATENT OFFICE 2,554,838

POTTERY MAKING MACHINE

Martin M. Miller, Brooklyn, N. Y.

Application December 30, 1949, Serial No. 135,872

8 Claims. (Cl. 25—22)

The present invention relates to pottery making machines and is more particularly directed toward machines suitable for use in schools, home workshops and the like for teaching the manufacture of pottery articles and in making pottery.

In the manual arts such as involve working with wood, metal or plastics, small versatile machines are available for use in the school, home workshop, etc., whereby one can be taught the rudiments of such arts and can make wooden, metal or plastic articles in a workmanlike manner. Such machines are suitable for limited manufacturing operations. At the present time, there is not available an all-purpose compact machine for use in teaching the making of pottery or in practicing the potter's art as a hobby. One has had to rely on makeshift apparatus.

The present invention contemplates a pottery making machine on which one can carry out all the usual pottery making operations suitable for use in the school, home or hobby shop.

According to the present invention, the machine is adapted to be motor driven and is provided with a potter's wheel adapted to be driven at a variable speed through a friction drive, a wedger and a ball mill, so that it is possible for the user to form and shape the clay on the potter's wheel, to prepare it for use and to grind the glazes desired for use in glazing the pottery blank. The present machine, together with suitable hand tools and an oven or kiln, makes it possible for the student or hobbyist to make pottery products.

The machine is also readily adaptable for carrying out other machining operations, such as grinding, polishing, sanding, sawing, drilling, etc., by employing suitable attachments.

Other and further objects will appear as the description proceeds.

The accompanying drawings show, for purposes of illustrating the present invention, one embodiment in which the invention may take form, together with modifications of certain parts, it being understood that the drawings are illustrative of the invention rather than limiting the same.

In the accompanying drawings:

Figure 1 is a side elevational view of the machine;

Figure 2 is a top plan view of the machine;

Figures 3 and 4 are opposite end elevational views of the machine;

Figures 5 and 6 are perspective views of the machine, the potter's wheel and tray being omitted, and showing the rolls in position to act either as a wedger (Fig. 5) or as a support for a ball mill (Fig. 6);

Figure 7a illustrates a cut-off saw attachment;

Figure 7b illustrates a lapidary attachment;

Figure 8 is a vertical longitudinal sectional view on the line 8—8 of Figures 2, 3 and 4;

Figure 9 is a horizontal sectional view taken on the line 9—9 of Figure 8;

Figure 10 is a vertical sectional view taken on the line 10—10 of Figure 9; and

Figure 11 is a fragmentary top plan view illustrating a modified form of construction.

The body of the machine is in the form of an inverted five-sided boxlike housing or casing 20. This casing has a top wall 21, front wall 22, rear wall 23 and end walls 24 and 25. It is open from underneath and is adapted to be supported on a suitable table, bench or other device.

A horizontal shaft 30 is mounted in bearings 31, 32 in the end walls 24 and 25. The shaft projects through each of these walls as indicated in the drawings, and is provided with a longitudinal keyway 33. The shaft is held against lengthwise movement by collars 34, 34. Adjacent the right collar 34 (Figs. 8 and 9), the shaft carries a drive pulley 35 adapted to be operated by a belt 35' passing down through the open bottom of the housing. Between the pulley 35 and the left collar 34, the shaft 30 carries a slidable sleeve 36 provided with pins 36' entering the keyway 33. The sleeve 36 is flanged as indicated at 37, and carries a friction wheel 38 of relatively small diameter.

The sleeve 36 carries a yoke 39 held in place by a collar 40. Coiled springs 41 and 42 about the shaft 30 yieldably urge the sleeve 36 toward a mid-position. The sleeve 36 is adapted to be moved along the shaft by a lever arm 43 which passes through a swivel 44 secured to the yoke 39 by a bolt 45. The rear end of the arm 43 is pivoted at 46 to a bracket carried by the rear wall 23 of the housing. The outer end of the arm 43 projects through a slotted plate 47 carried by the front wall 22 of the machine and notched as indicated so as to hold the arm or rod 43 in adjusted position. When the handle on the outer end of the arm 43 is lifted out of the notch, it is possible to slide the sleeve 36 and friction wheel 38 back and forth along the shaft 30. This takes place more easily when the shaft 30 is being driven.

The upper wall 21 of the housing has a bearing receiving boss 50 carrying a thrust bearing 51 and a radial bearing 52 having a forced fit. These bearings receive a vertical shaft 53 which carries fixed collars 54, 55 and 56 so that vertical movement of the shaft in either direction is prevented. The lower end of the shaft 53 has a keyway at 57 and carries a friction disk 58 urged downwardly against the friction wheel 38 by a coiled spring 59. The upper end of the shaft 53 passes through a felt washer 53' in retainer 53", and carries a potter's wheel, or throwing head, 60 having a pin 61 which enters a keyway 62 in the shaft 53. The potter's wheel 60 is readily removable from the shaft.

A tray 65 is secured to the top of the cast body 20 by screws indicated at 66. This tray has openings 67, 67 to accommodate bosses 68, 68 carried by the top wall of the casting 20. These bosses are adapted to detachably carry upwardly extending shafts 69. The tray is adapted to retain material which falls off the potter's wheel and has dams 70a, 70b, and, if desired, a plugged drain 71. The shafts 69 may support tool rests such as indicated at 72 (Fig. 1).

The outer end of the main shaft 30 which protrudes to the left of the wall 24 (Figs. 6, 8 and 9) is received in a bushing 74 carried in bracket 75. This outwardly extending end of the shaft 30 carries a roller or drum 80 provided with a corrugated rubber surface 81. It also carries sleeves 82, 83 on which are loosely mounted arms 84 and 85. The drum 80 is locked in position between these arms by a screw 86 so that the drum may be driven from the shaft and the arms 84, 85 held at the desired spacing along the shaft. The arms 84 and 85 are slotted as indicated at 86 and 87 and on a rod 88 carry a roller 89 similar to the roller 80 but freely rotatable on the rod 88. The rod 88 has a headed end 90 in the slot 86 and a threaded end 91 carrying a thumb nut 92 so that the rod 88 may be fixed in any adjusted position lengthwise of the slots 86, 87 so as to vary the spacing of the rollers 80 and 89.

The inner arm 84 carries a pin 93 adapted to be placed in selected slot such as 94a, 94b, 94c in the end wall 24 of the casing. This arrangement makes it possible to secure the roller 89 either in the lower position of Fig. 6, where the two rollers are adapted to support a ball mill indicated in the form of a rotatable jar 95, or to shift it to an upper position such as indicated in Fig. 8, or to an oblique position such as indicated in Fig. 5. In the latter positions, the rollers 80, 89 may be employed to knead or roll the clay to be used in making up the pottery article. The thickness to which the clay is kneaded is varied by adjusting the position of the roller 89.

When the bracket 75 is detached, a belt sander may be placed about the rollers, or drum sanders substituted for the roller 80. The portion of the shaft 30 extending to the right of Figs. 1, 8 and 9 may be used as an arbor for grinding wheels, saws, polishing wheels and the like, to secure a drill or other chuck. Figure 7a shows its use to drive a cut-off saw 96 in a housing 97 supplied by water from the tray 65, and having spring tensioned, swingable vise 98.

The pottery making machine shown herein is well adapted for instruction or home use in connection with the making of pottery articles. The power driven shaft can be used to drive the potter's wheel 60 at various speeds and in either direction depending upon the adjustment of the arm 43. The debris from the making of the article of pottery is caught in the tray so that it is kept off the driving mechanism and the machine is kept clean. The tray may be readily washed out and drained through the drain indicated at 71.

While the operator is working at the wheel in making the pottery, the rollers in horizontal position may be used to operate the ball mill to grind the colors. Also when desired, the rollers can be shifted to the other position to knead the clay.

The machine is also readily adaptable in accomplishing fine grinding, lapidary and the like. For this purpose the post 69 is employed to support a lapidary head 99 (Fig. 7) having adjustments by which it is possible to position the gem in any desired position and hold it there while being ground. Instead of a potter's wheel driven from the upper end of the shaft 53, one may use a suitable grinding wheel or lap with vertical or horizontal grinding faces.

In the modified form of construction illustrated in Fig. 11, the shaft 30 carries a yoke 100 having an operating arm 101 similar to the arm 43. This yoke spans the friction wheel 102 similar to the friction wheel 38 and slides the same along the shaft 30. With this arrangement, it is possible to obtain the same speed regulation in both directions.

Since it is obvious that the invention may be embodied in other forms and constructions within the scope of the claims, I wish it to be understood that the particular form shown is but one of these forms, and various modifications and changes being possible, I do not otherwise limit myself in any way with respect thereto.

What is claimed is:

1. A machine for use in pottery making comprising a casing, a horizontal power driven shaft journaled in said casing, one end of said shaft projecting out of the casing, for providing an auxiliary power drive, a vertical shaft projecting upwardly from said casing and at right angles to said power shaft, a change speed gear operatively connecting the power driven shaft and said second shaft, and a potter's wheel carried by said second shaft.

2. A machine for use in pottery making comprising a casing, a horizontal power driven shaft journaled in said casing, one end of said shaft projecting out of the casing, for providing an auxiliary power drive, a vertical shaft projecting upwardly from said casing and at right angles to said power shaft, a change speed gear comprising a friction wheel variably positionable along said power shaft and a cooperating disk, frictionally driven by said wheel and secured to said second shaft, and a potter's wheel carried by said second shaft.

3. A machine for use in pottery making comprising a body having a top wall and end walls, a horizontal shaft mounted in the end walls and carrying a driving pulley and a slidable sleeve, a friction wheel drivingly connected to the sleeve to be driven by the shaft, a vertical shaft rotatably carried by the top wall and held against vertical movement, the lower end of the vertical shaft carrying a friction plate slidable therealong and rotatable therewith, a spring pressing the friction plate against the friction wheel, the upper end of the vertical shaft protruding above the top wall of the body, and a potter's wheel secured to the upper end of the shaft.

4. A machine such as claimed in claim 3 having a tray supported by the top of the body and about the potter's wheel.

5. A machine such as claimed in claim 3 wherein the body carries a notched plate and having a sleeve adjusting arm held in place by the notched plate.

6. A machine for use in pottery making, comprising a casing having end walls and a top wall, a horizontal shaft carried by the end walls and extending beyond one of said end walls, a driving pulley on the shaft, a bracket supporting the free end of the shaft, two arms pivoted on the shaft, a shaft driven roller between the arms, an idler shaft carried by the arms parallel with the shaft and adjustable to various radial positions on the arms, a shaft driven roller carried by the first shaft between the arms, a roller carried by the second shaft and means to secure the arm adjacent the housing to the housing in a horizontal position for supporting a ball mill cylinder on the rollers or in a higher position for using the rollers as squeeze rollers to knead clay.

7. In a pottery making machine, a body, a vertical shaft rotatably carried in the body and held against vertical movement, a friction driving disk slidably and non-rotatably carried by the lower end of the shaft, a spring urging the disk downwardly, a horizontal shaft under the disk, a friction wheel drivingly carried by the horizontal shaft and on which the disk bears, a tray carried by the body and through which the vertical shaft projects, a work wheel carried by the upper end of the vertical shaft and housed in the tray, and a body carried tool support extending upwardly through the tray and lateral of the work wheel.

8. A pottery making machine as claimed in claim 7, wherein the friction wheel is secured to a slidable sleeve carried by the horizontal shaft, and having an adjusting arm carried by the sleeve.

MARTIN M. MILLER.

REFERENCES CITED

The following references are of record in the file of this patent:

UNITED STATES PATENTS

| Number | Name | Date |
|---|---|---|
| 1,381,246 | Simpson | June 14, 1921 |
| 2,195,100 | Smith | Mar. 26, 1940 |
| 2,438,465 | Strauss et al. | Mar. 23, 1948 |
| 2,481,073 | Brock | Sept. 6, 1949 |

FOREIGN PATENTS

| Number | Country | Date |
|---|---|---|
| 377,404 | Great Britain | July 28, 1932 |